United States Patent
Stumpe et al.

(10) Patent No.: US 11,983,912 B2
(45) Date of Patent: May 14, 2024

(54) PATHOLOGY PREDICTIONS ON UNSTAINED TISSUE

(71) Applicant: VERILY LIFE SCIENCES LLC, South San Francisco, CA (US)

(72) Inventors: Martin Stumpe, Mountain View, CA (US); Lily Peng, Mountain View, CA (US)

(73) Assignee: VERILY LIFE SCIENCES LLC, South San Francisco, CA (US)

(*) Notice: Subject to any disclaimer, the term of this patent is extended or adjusted under 35 U.S.C. 154(b) by 0 days.

(21) Appl. No.: 16/958,548

(22) PCT Filed: Sep. 7, 2018

(86) PCT No.: PCT/US2018/049989
§ 371 (c)(1),
(2) Date: Jun. 26, 2020

(87) PCT Pub. No.: WO2019/160580
PCT Pub. Date: Aug. 22, 2019

(65) Prior Publication Data
US 2021/0064845 A1  Mar. 4, 2021

Related U.S. Application Data

(60) Provisional application No. 62/631,259, filed on Feb. 15, 2018.

(51) Int. Cl.
*G06V 10/25* (2022.01)
*G01N 1/30* (2006.01)
(Continued)

(52) U.S. Cl.
CPC ............... *G06V 10/25* (2022.01); *G01N 1/30* (2013.01); *G06T 7/0012* (2013.01);
(Continued)

(58) Field of Classification Search
CPC ........ G06K 9/0014; G06K 9/323; G01N 1/30; G06T 7/0012; G06T 2207/20081;
(Continued)

(56) References Cited

U.S. PATENT DOCUMENTS 3,740,143 A * 6/1973 Groner .................. G01N 1/312
356/411
7,689,023 B2  3/2010 Rabinovich
(Continued)

FOREIGN PATENT DOCUMENTS

| CN | 105027165 | 11/2015 |
|----|-----------|---------|
| JP | 2016 541039 | 12/2016 |
| WO | 2015/049233 | 4/2015 |

OTHER PUBLICATIONS

The International Search Report (ISR) with Written Opinion for PCT/US2018/049989 dated Dec. 20, 2018, pp. 1-14.
(Continued)

*Primary Examiner* — Tsung Yin Tsai
(74) *Attorney, Agent, or Firm* — Kilpatrick Townsend & Stockton LLP

(57) ABSTRACT

A method for training a pattern recognizer to identify regions of interest in unstained images of tissue samples is provided. Pairs of images of tissue samples are obtained, each pair including an unstained image of a given tissue sample and a stained image of the given tissue sample. An annotation (e.g., drawing operation) is then performed on the stained image to indicate a region of interest. The annotation information, in the form of a mask surrounding the region of interest, is then applied to the corresponding unstained image. The unstained image and mask are then supplied to train a pattern recognizer. The trained pattern recognizer can then be used to identify regions of interest within novel unstained images.

20 Claims, 9 Drawing Sheets

(51) Int. Cl.
    *G06T 7/00*    (2017.01)
    *G06V 20/69*    (2022.01)

(52) U.S. Cl.
    CPC .. *G06V 20/695* (2022.01); *G06T 2207/20081* (2013.01); *G06T 2207/20084* (2013.01); *G06T 2207/30024* (2013.01); *G06T 2207/30068* (2013.01)

(58) Field of Classification Search
    CPC . G06T 2207/20084; G06T 2207/30024; G06T 2207/30068
    See application file for complete search history.

(56) References Cited

U.S. PATENT DOCUMENTS

| | | | | |
|---|---|---|---|---|
| 10,572,996 | B2* | 2/2020 | Eurèn | G06F 18/2431 |
| 10,824,847 | B2* | 11/2020 | Wu | G06T 11/001 |
| 11,354,804 | B1* | 6/2022 | Behrooz | G06N 3/08 |
| 2009/0190820 | A1 | 7/2009 | DeLa Torre Bueno | |
| 2011/0038523 | A1 | 2/2011 | Boardman | |
| 2011/0286654 | A1* | 11/2011 | Krishnan | G06T 7/155 |
| | | | | 382/128 |
| 2012/0082362 | A1 | 4/2012 | Diem et al. | |
| 2017/0169567 | A1* | 6/2017 | Chefd'hotel | G06T 7/0012 |
| 2017/0322124 | A1* | 11/2017 | Barnes | G06T 7/0014 |
| 2017/0372471 | A1* | 12/2017 | Eurèn | G06F 18/214 |
| 2019/0188446 | A1* | 6/2019 | Wu | G06V 20/695 |
| 2019/0205760 | A1* | 7/2019 | Wiestler | G06N 20/10 |
| 2020/0372235 | A1* | 11/2020 | Peng | G06V 20/695 |
| 2021/0064845 | A1* | 3/2021 | Stumpe | G06V 20/695 |

OTHER PUBLICATIONS

Gurcan, Metin N. et al. "Histopathological image analysis: A review" IEEE Rev Biomed Eng. (2009) vol. 2, pp. 147-171.
Chinese Application No. 201880089436.9, Office Action, dated May 25, 2021, 8 pages.
Bautista et al., "Digital Staining of Unstained Pathological Tissue Samples through Spectral Transmittance Classification", Optical Review, vol. 12, No. 1, Jan. 1, 2005, pp. 7-14.
European Application No. 21209652.3 , Extended European Search Report, dated Feb. 24, 2022, 10 pages.
Khouj et al., "Hyperspectral Imaging and K-Means Classification for Histologic Evaluation of Ductal Carcinoma In Situ", Frontiers in Oncology, vol. 8, Feb. 7, 2018, 9 pages.

* cited by examiner

PATHOLOGY PREDICTIONS ON UNSTAINED TISSUE

CROSS REFERENCE TO RELATED APPLICATIONS

The present application claims priority as a U.S. national stage entry of PCT application serial no. PCT/US2018/049989 filed Sep. 7, 2018, which claims priority to U.S. provisional application 62/631,259 filed 15 Feb. 2018. The full disclosure of PCT/US2018/049989 and U.S. provisional application 62/631,259 is incorporated herein by reference.

BACKGROUND

This disclosure relates to the field of digital pathology and more particularly to a method for generating a mask in a digital image of a tissue specimen. The term "mask" in this document refers to a closed polygon region or otherwise specified area in an image of the tissue specimen enclosing or otherwise indicating a region of interest, such as cancer cells (for example, cells of a tumor).

Digital images of tissue samples with a mask, and possibly an associated label for the sample, such as "cancerous", are used in several contexts, including as training examples for constructing machine learning models. Such machine learning models can be developed for various purposes, including aiding in diagnosis, clinical decision support and for making predictions for the patient providing the tissue sample, such as predicting survival, or response to treatment.

Machine learning models for making predictions from images of slides containing tissue specimens require accurate "ground truth" masks and optionally assignment of a label to the specimens. As noted above, the masks may be in the form of polygons that are outlining regions of interest, such as regions that contain tumor cells. One example of a method for creating a mask is described in the pending U.S. patent application of C. Gammage, Ser. No. 15/621,837 filed Jun. 13, 2017, the content of which is incorporated by reference herein.

Neural network pattern recognizers for recognizing cancerous cells in digital magnified images of tissue specimens are disclosed in PCT application serial no. PCT/US2017/019051 filed Feb. 23, 2017, and in the scientific and technical literature cited therein, the content of which is incorporated by reference. The Inception-v3 deep convolutional neural network architecture, upon which a pattern recognizer as described herein may be based, is described in the scientific literature. See the following references, the content of which is incorporated by reference herein: C. Szegedy et al., *Going Deeper with Convolutions*, arXiv:1409.4842 [cs.CV] (September 2014); C. Szegedy et al., *Rethinking the Inception Architecture for Computer Vision*, arXiv: 1512.00567 [cs.CV] (December 2015); see also US patent application of C. Szegedy et al., "*Processing Images Using Deep Neural Networks*", Ser. No. 14/839,452 filed Aug. 28, 2015. A fourth generation, known as Inception-v4 is considered as another possible architecture for such pattern recognizers. See C. Szegedy et al., Inception-v4, *Inception-ResNet and the Impact of Residual Connections on Learning*, arXiv:1602.0761 [cs.CV] (February 2016). See also US patent application of C. Vanhoucke, "Image Classification Neural Networks", Ser. No. 15/395,530 filed Dec. 30, 2016. The description of the convolutional neural networks in these papers and patent applications is incorporated by reference herein. Note that alternative network architectures, including Resnet and MobileNet, or some other form of pattern recognizer could be applied to perform image processing and/or segmentation tasks.

In pathology today, cancer staging and diagnosis from tissue samples is commonly done on H&E (hematoxylin and eosin) stained tissue specimens. Additionally, machine learning models are typically trained from images of H&E stained tissue specimens. The H&E stain is an unspecific stain which highlights the overall morphology of the tissue. In contrast, there are special stains (including among others immunohistochemical stains, IHCs, Verhoeff's stain, Masson's trichrome stain) that highlight specific antigens, such as tumor markers. Pathologists can usually render a diagnosis and outline the tumor on H&E images, but sometimes require special stains such as IHC stained images for difficult cases. It is also believed that the use of an IHC stained (or other special stained) slide speeds up the human examination and annotation process. However, as a general matter, a tissue slide can either have an H&E stain or an IHC stain, but usually not both at the same time. A common solution therefore is to cut serial sections of tissue and subject them both to staining, microscopy and capture of digital images, where section N is stained with H&E, and section N+1 is stained with an IHC stain, so that the IHC stained tissue is morphologically similar enough (about 5 microns away, which is ~5% of a human cell diameter) to be used alongside the H&E stained tissue image. However, the morphological differences in serial sections are still significant and can lead to inaccuracies in ground truth labels and masks generated in this fashion. Another factor that further increases morphological differences for serial sections is that the two sections are handled separately during processing, and the two tissues might get stretched slightly differently during the processing (e.g. when putting the freshly cut glass section on the glass carrier).

SUMMARY

In one aspect, the present disclosure makes use of paired stained and unstained images of tissue samples to train a pattern recognizer to identify regions of interest in images of unstained tissue samples. The trained pattern recognizer can detect regions of interest based on tissue features that may be distorted, de-emphasized, occluded, or otherwise diminished upon staining of the tissue sample. The training method includes receiving, for an image of a stained tissue sample, an annotation that is indicative of a region of interest within the stained tissue sample. A mask surrounding the region of interest in the image of the stained tissue sample is then applied to an image of the tissue sample taken when the tissue sample is in an unstained state (an "unstained image" of the tissue sample). The stained and unstained images may be aligned to each other. The unstained image and mask applied thereto are then used as a training example (e.g., in combination with a plurality of additional unstained images and masks applied thereto) to train the pattern recognizer. The "stained image" may represent a tissue sample after having been subject to H&E staining/imaging and/or IHC (or other special) staining/imaging The method can be performed on a multitude of slides containing tissue specimens, thereby building up a training set of unstained images with masks around cancer cells or some other region(s) of interest (e.g., cancer cells in a sample of lymph, breast, or prostate tissue). Such a set of digital images can be provided to a neural network pattern recognizer as a training set for training the pattern recognizer. The neural network pattern recognizer could be for example of the design cited in the scientific and patent literature cited previously.

In one aspect there is provided a method for identifying a region of interest within an unstained image of a tissue sample using such a trained pattern recognizer.

In still another aspect, a workstation is provided which comprises a processing unit and a display. The display is configured to display digital magnified images of a single slide containing a tissue specimen stained with, e.g., a hematoxylin and eosin (H+E) stain, an immunohistochemical (IHC) stain, or some other staining agent. The workstation is configured with either (a) user interface tools by which an operator inspecting the registered digital magnified images on the display may annotate a digital magnified image of the tissue specimen stained with the staining agent so as to form a closed polygon or other shape to mark a region of said image containing region of interest (e.g., tumor cells) to thereby create a mask. The workstation is also configured to transfer the mask to an image (e.g., a digital magnified image) of the tissue specimen in an unstained state.

In still another aspect, a system is disclosed for creating training examples for a pattern recognizer as described herein. The system includes in combination a whole slide scanner for scanning slides containing a tissue sample both before and after such slides are stained by a staining agent, a mechanism for providing such a staining agent to the tissue samples; and a pathology workstation as recited in the previous paragraph.

The pathology workstation or the system above may further include a machine learning system for building machine learning models from training examples from digital magnified images of unstained tissue specimens. The training examples are in the form of digital magnified pathology images annotated by the pathology workstation and methods of this disclosure.

The methods described herein may be used to obtain unstained images of a tissue sample in which a region of interest is identified that is, e.g., typically difficult to identify without applying a stain or other contrast agent. This may be achieved by identifying the region of interest in an image of the same tissue sample that is stained, for example an IHC stain or an H+E stain, that allows the region of interest to be identified more easily, either by manual input by a trained operator using the image or by using image processing techniques. The unstained images with the region of interest identified can be used to train a neural network to identify a corresponding region of interest in an additional unstained image. Such a trained neural network may be able to identify a region of interest with a certain property, for example a region of interest including cancerous cells, using unstained images. In this way, unstained images may be used to identify regions of interest using features of unstained images that are not generally used for identification by human operators or by machine learning algorithms. In some aspects, such unstained images could be used in combination with stained images by a pattern recognizer to provide estimated regions of interest that have an improved quality relative to such regions of interest determined without the benefit of unstained image data.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

BRIEF DESCRIPTION OF THE DRAWINGS

FIG. 7B is a magnified image of the tissue sample of FIG. 7A in an unstained state.

DETAILED DESCRIPTION

Figure 1:
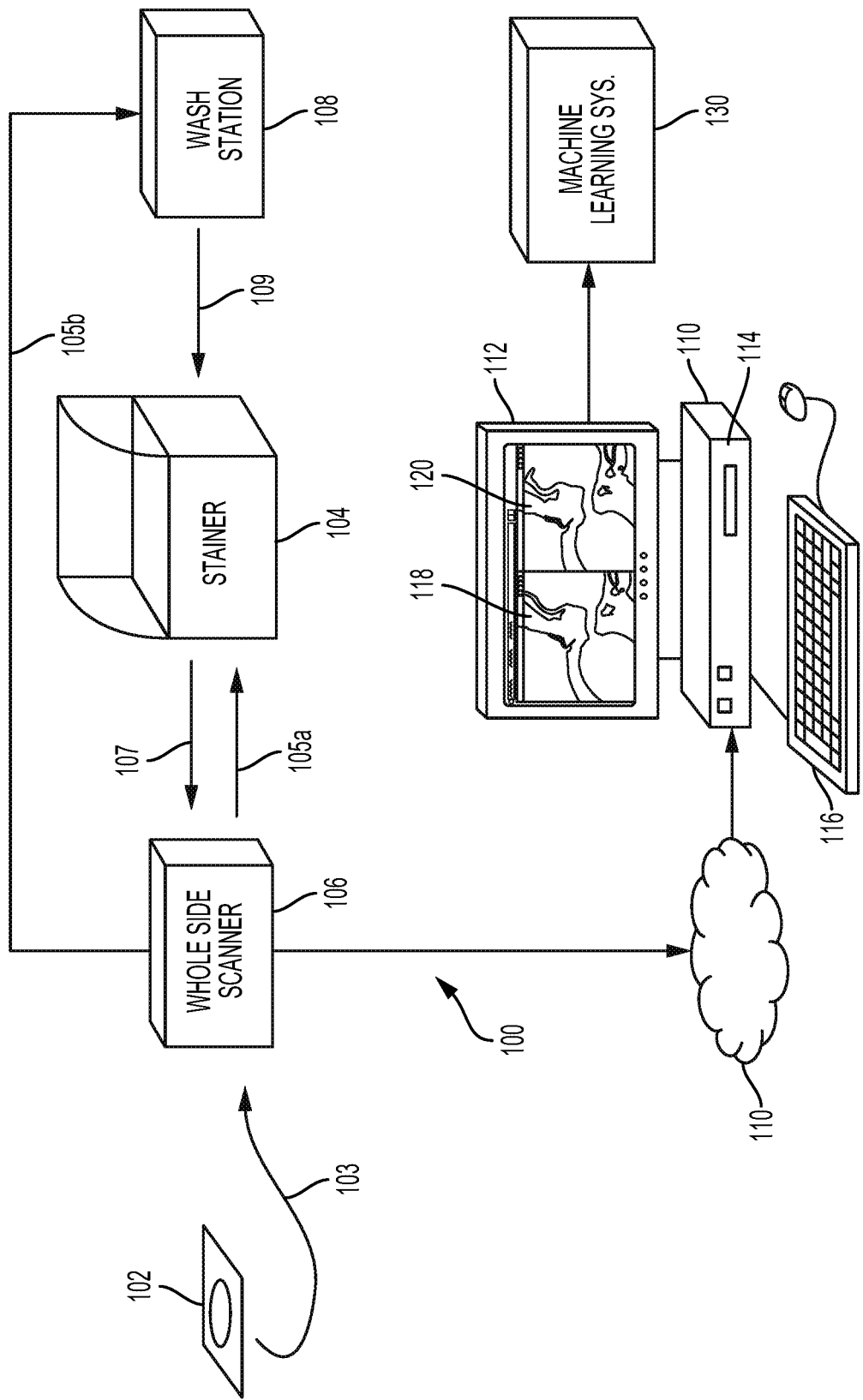
FIG. 1 is an illustration of a laboratory environment including pathology workstation in which the method is practiced.

Attention will now be directed to FIG. 1 which is an illustration of a laboratory 100 environment in which a method as described herein may be practiced. A tissue sample (e.g., a sample that has been formalin fixed and paraffin embedded), is placed onto a microscope slide 102 and the tissue sample is placed into supplied as indicated at 103 to a whole slide scanner 106. Such scanners are also widely known and available from a variety of vendors. The whole slide scanner 106 scans the slide at a user specified magnification, such as 10×, 20× or 40×. The whole slide scanner includes a digital camera for capturing magnified, color digital images of the specimen. The digital magnified image of the unstained slide (an "unstained image") is then stored, either locally in the whole slide scanner 106, in a cloud network or other remote server, on a local hard disk 114 of a pathology workstation 110, or in some other storage medium.

The slide, after having been scanned by the whole slide scanner 106, is then sent as indicated at 105a to a stainer 104 that is configured to apply one or more stains to the tissue sample. Commercial stainers for applying H&E, IHC and other special stains to tissue samples are known and available from a variety of vendors. For example, the stainer 104 may initially stain the slide with H&E staining agents, and a cover slip may be placed over the tissue sample. Following such staining, the slide is then provided as indicated at 107 to the whole slide scanner 106. The slide is scanned and imaged in the scanner 106 at the same magnification as the first unstained image and the second digital magnified image of the stained slide (a "stained image") is stored in a memory. Additionally or alternatively, different sections from a serial sectioning of a tissue sample could be used to generate stained and unstained images for the tissue sample. For example, the tissue sample could be sliced into thin (e.g., several microns thick) sections, and a first section could be imaged without staining to generate an unstained image of the tissue sample while a second section, neighboring or otherwise proximate to the first section, could be stained and imaged to generated a stained image of the tissue sample.

The slide may optionally be washed and/or stained with additional staining agents to provide additional stained images, corresponding to the additional staining agents, of the tissue sample. For example, following imaging of the stained sample slide by the whole slide scanner 106, the stained tissue slide may be provided, as indicated at 105b, to a wash station 108 containing washing apparatus and associated chemicals and trained personnel to wash out (i.e., remove) the staining agents (e.g., H+E staining agents) previously applied by the stainer 104 such that the slide can be re-stained with a second, different stain. Such a different stain may include a special stain such as an IHC stain or a multiplex stain. The wash station 108 includes apparatus and chemicals so that the user can perform any well-known procedure for washing H&E staining agents from a tissue specimen. In one example, the following procedure is employed:

1. Soak the slide in xylene to remove the coverslip.
2. Once the coverslip is removed, rinse the slide several times with xylene. Then perform 2 to 3 rinses of the slide with EtOH, then several rinses with water. Most of the eosin will typically rinse out in water. Now place the slide in acid alcohol for a minute or two. Rinse the slide again in water.

After the procedure for washing the already-applied staining agents from the tissue specimen is performed, the slide is then sent back to the stainer 104 as indicated at 109 and the slide is stained with a second, different or special stain, e.g., an IHC stain, then sent as indicated at 107 to the whole slide scanner 106. The slide is scanned and imaged in the scanner 106 at the same magnification as the first unstained image and the second stained image and an additional digital magnified image of the stained slide (an "additional stained image") is stored in a memory.

Note that such an additional staining agent (e.g., an IHC staining agent) could be applied to an already-stained tissue sample (e.g., an H+E stained tissue sample) without washing out the staining agent already present in the tissue sample. In such an example, the already-stained tissue sample would be provided, following imaging of the sample by the whole slide scanner 106, to the stainer 104 as indicated at 105a.

The two (or more) digital magnified images of the tissue sample may then be registered to each other. The registration may be performed in any convenient way, for example using well known image processing techniques to determine the X/Y coordinates for various key features in the images, such as areas of high contrast, corners, boundaries, etc. so that the X/Y pixel location of each of the key features of one of the images can be correlated or matched to the X/Y pixel locations of the same key features in the other image. In one embodiment we use SIFT (a feature extraction method) to determine areas with sharpness or color distribution gradients to identify key features or locations in the image (for example 10 key features) and determine matching feature vectors. The registration step is performed for two reasons: 1) so that the stained and unstained images, 118 and 120 respectively (FIG. 1), and/or any additional stained images, can be displayed side by side or on top of each other on the display 112 of the workstation in a coordinated manner, and 2) when the user annotates the stained (e.g., H+E, IHC) image 118 to draw a mask, the X/Y locations of each vertex in the mask (polygon) or other location(s) of the mask can be transferred to the unstained image (e.g., to permit the unstained image and mask to be provided as a training example to train a pattern recognizer). The workstation includes user interface tools including the keyboard 116, mouse and display 112 to facilitate annotation of stained images to draw the mask and optionally to assign a label to the specimen, e.g., "cancerous."

After the annotation process to generate the mask and assign the label to the specimen has been performed, in one embodiment the annotated unstained image of the tissue specimen with the mask is supplied to a machine learning system 130 as a training example for training a machine learning model (e.g., an artificial neural network or other type of pattern recognizer) in the system 130. This aspect will be described in greater detail in conjunction with FIG. 5 later in this document.

Figure 2:
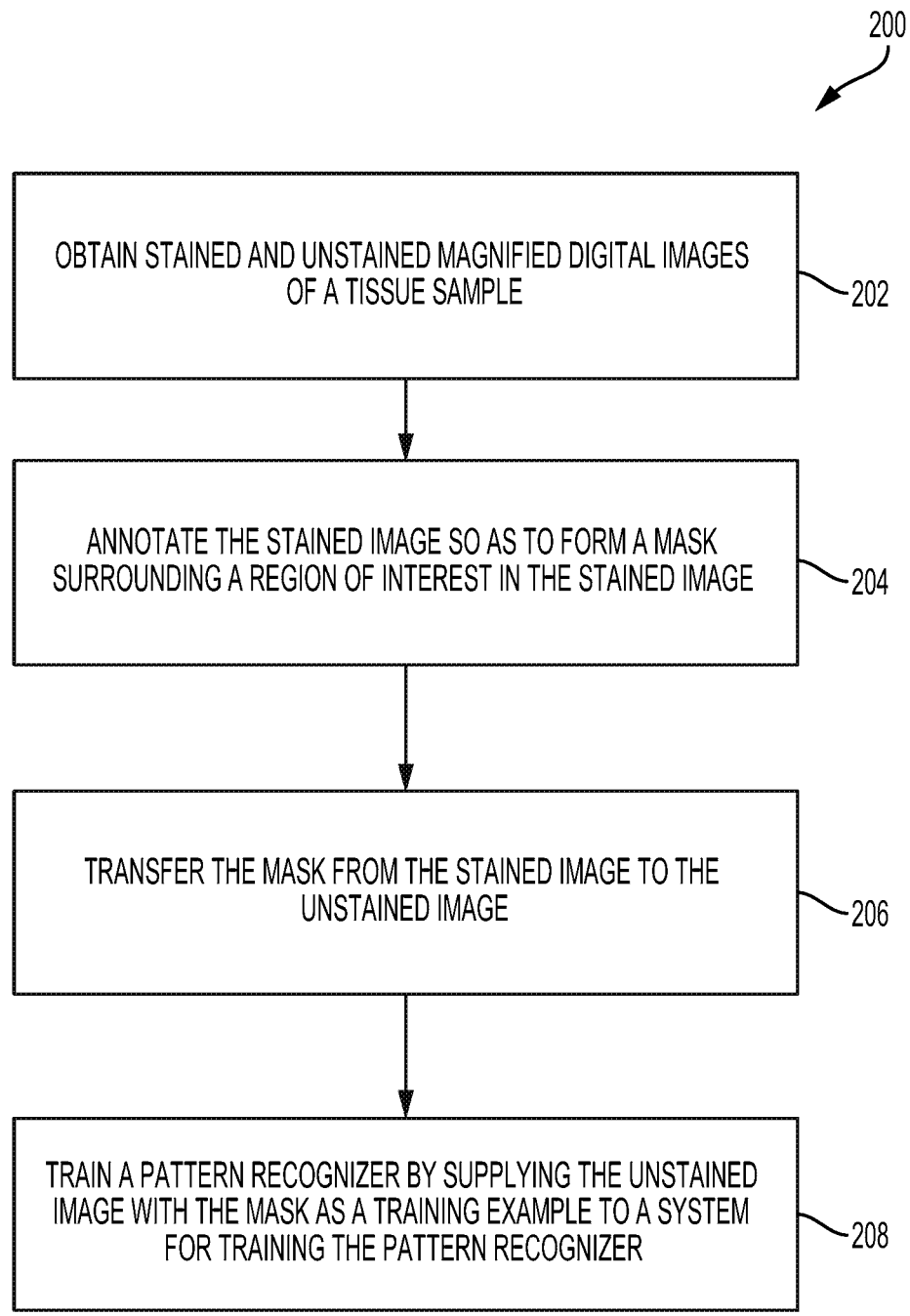
FIG. 2 is a flowchart showing the methodology for training a pattern recognizer in accordance with one embodiment.

FIG. 2 is a flowchart showing the methodology for generating a mask for an unstained tissue specimen image in accordance with one embodiment using the system of FIG. 1 as described above. In step 202 stained and unstained images of a slide containing the tissue specimen are obtained. This can include scanning the slide both before and after staining at the same magnification M (e.g., 10×, 20, and/or 40×) in the whole slide scanner 106. Alternatively, a different magnification can be used and the resulting magnified digital image may be downsampled or upsampled to obtain digital image data at other magnifications (e.g., at a magnification corresponding to the magnification of another of the obtained digital images). Step 202 may include obtaining additional magnified digital images of the slide, e.g., after the slide has been stained with additional staining agents (e.g., using the stainer 104 of FIG. 1) and/or after one or more staining agents have been washed out of the slide (e.g., using the wash station 108 of FIG. 1).

At step 204, the creation of the mask, e.g., using user interface tools and the side by side display of the digital images is performed. The user annotates one or more of the stained digital images on the workstation 112 as indicated in FIG. 1. The user annotation is used to generate a mask in the digital images that is indicative of a region of interest (e.g., a region containing cancer cells) within the stained image(s). The mask may indicate the region of interest in a variety of ways. For example, the mask may specify vertices or other information about one or more closed polygonal (or other specified geometric) regions within the stained digital image. In another example, the mask may specify a set of pixels or other pre-specified regions within the stained digital image that correspond to the region of interest.

Additionally or alternatively, step 204 may include algorithmically generating the mask and/or annotation information based on the stained image(s). Image analysis or classification methods are performed in software on the stained image(s) to identify cancer cells, cysts, abnormal portions of microvasculature, bacterial biofilms, scar tissue, plaques or other non-cellular structures, or other region(s) of interest in the image, and then construct a closed polygon or otherwise-defined mask around such cells or other structures or substances of interest. The construction of such closed polygons or other masks may be limited to detection of cancer cells or other tissue or structures of interest in regions that have a minimum size so as to create more useful masks and avoid creation of masks of, e.g., isolated cells or small groups of cells. The algorithmic creation of such a mask in a stained image could be performed using one of several possible techniques:

a) thresholding the stained image on certain stain colors and drawing a polygon around regions having pixels with the stain color above the threshold; or b) using a neural network or other pattern recognition classifier trained to recognize cancer cells or other substances or structures of interest in stained tissue sample images to find such substances or structures in the stained image. Neural network and other classification methods for automatic detection of regions of interest and/or cancer cells in digital images, e.g., based on cellular morphology and pixel intensity variations in stained digital images, is known in the art and therefore a detailed description is omitted for the sake of brevity. See e.g., the discussion of PCT/US2017/019051 filed Feb. 23, 2017 and scientific and patent literature cited previously.

At step 206 the mask is transferred from the stained image(s) to the unstained image. This can include aligning or otherwise registering the unstained image to the stained image(s), as explained above. Transferring the mask to the unstained image could include distorting, warping, or otherwise modifying the mask according to the alignment or registration between the unstained image and the stained image(s). In another example, the unstained image could be distorted, warped, or otherwise modified according to the alignment or registration, and the mask could be transferred to the modified version of the unstained image. In yet another example, the stained image could be distorted, warped, or otherwise modified according to the alignment or registration, and the annotation of step 204 could be performed for the modified version of the stained image. Transferring the mask may be facilitated by such alignments and/or registrations, because the known X/Y locations of vertices, splines, pixels, or other elements of the mask within the stained image may be translated directly to the unstained image.

At step 208 the unstained image and mask transferred thereto are supplied, as a training example, to a system for training a pattern recognizer (e.g., machine learning system 130 of FIG. 1) in order to train the pattern recognizer. This aspect will be described in greater detail in conjunction with FIG. 5 later in this document. In some examples, the stained image(s) may also be provided as part of the training example, in order to train the pattern recognizer to generate masks based on the combination of the unstained image and the stained image(s). Such a pattern recognizer, being trained to generate masks based on the combination of multiple images (including an unstained image), may generate higher-quality masks than a pattern recognizer that does not take into account the unstained image.

Figure 3A:
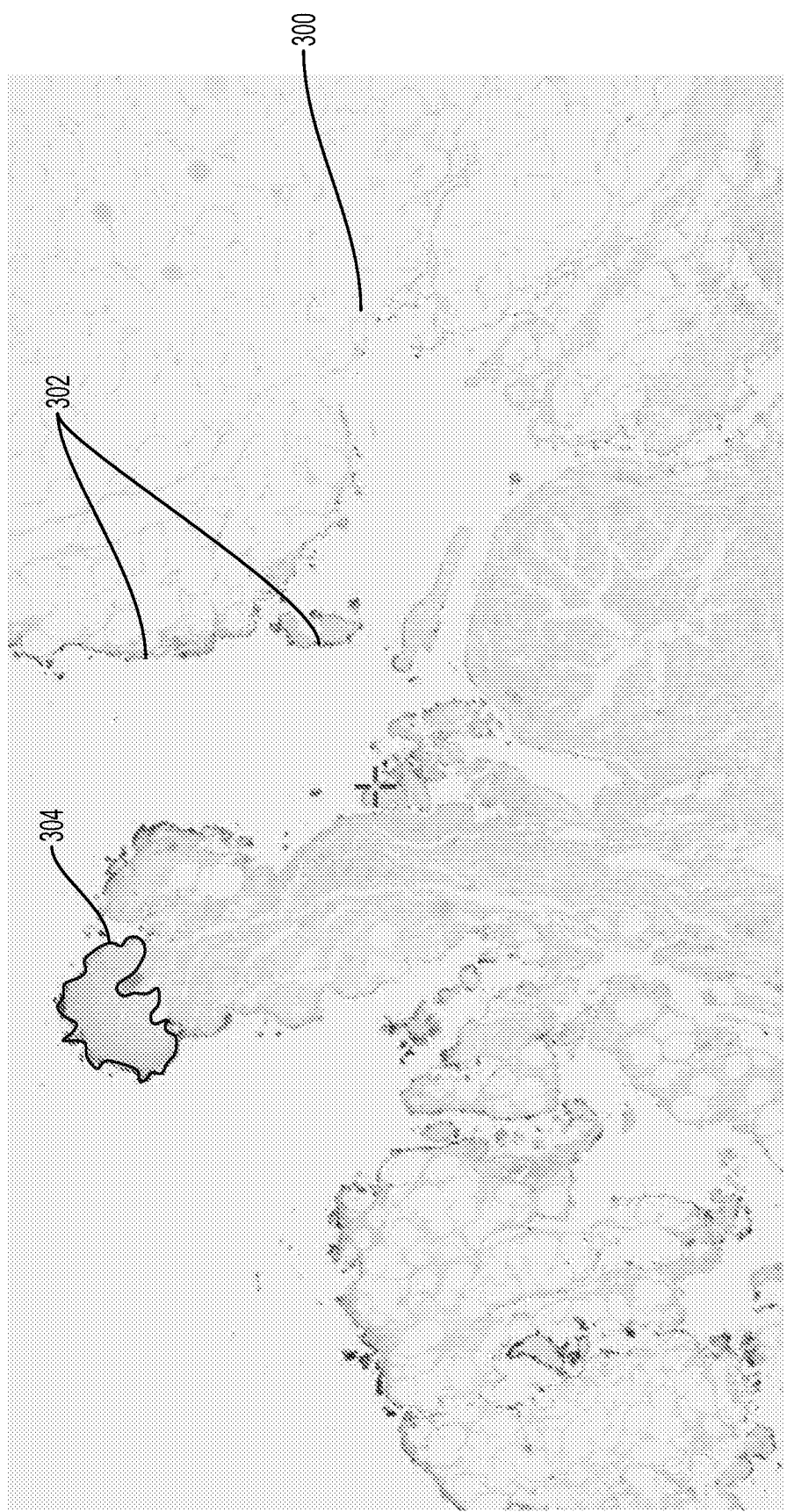
FIG. 3A is an illustration of a portion of a tissue sample image in which a mask is drawn or created algorithmically over a region of interest, such as tumor cells. It will be understood that for some tissue specimens there may be more than one mask created for a given slide image.

FIG. 3A is an illustration of a magnified image of a stained tissue sample, with regions of darker contrast indicating cancerous cells in the tissue sample. FIG. 3A includes an illustrative example of a mask 304 that is created in the image of stained tissue specimen 300 having various tissue features 302. The mask 304 shown in FIG. 3A is a closed polygonal region having any arbitrary boundary consisting of vertices and connecting lines. Additionally or alternatively, a mask may be defined in some other manner, for example, as a description of a set of pixels or other defined regions, of a superset of such pixels or other defined regions, that correspond to a region of interest. In yet another example, the mask could be defined by a set of splines or other curvilinear elements defining one or more closed regions.

Typically the mask is highly irregular in shape and is constructed manually by a user (typically a trained pathologist) operating a workstation (e.g., as depicted in FIG. 1) and using simple controls on the user interface of the workstation (e.g., a stylus, a mouse, a keyboard, a touch-sensitive display) to draw a perimeter of the mask. The user may wish to zoom in to see areas of the stained image (e.g., high-contrast regions) in greater detail. The X/Y locations of the vertices of such a mask boundary in the stained image, or other information specifying the mask (e.g., pixels identities or locations, spline locations or curvatures) are stored in memory so that the mask can be transferred to an unstained image, used to train a pattern recognizer, or used for some other purpose.

Figure 3B:
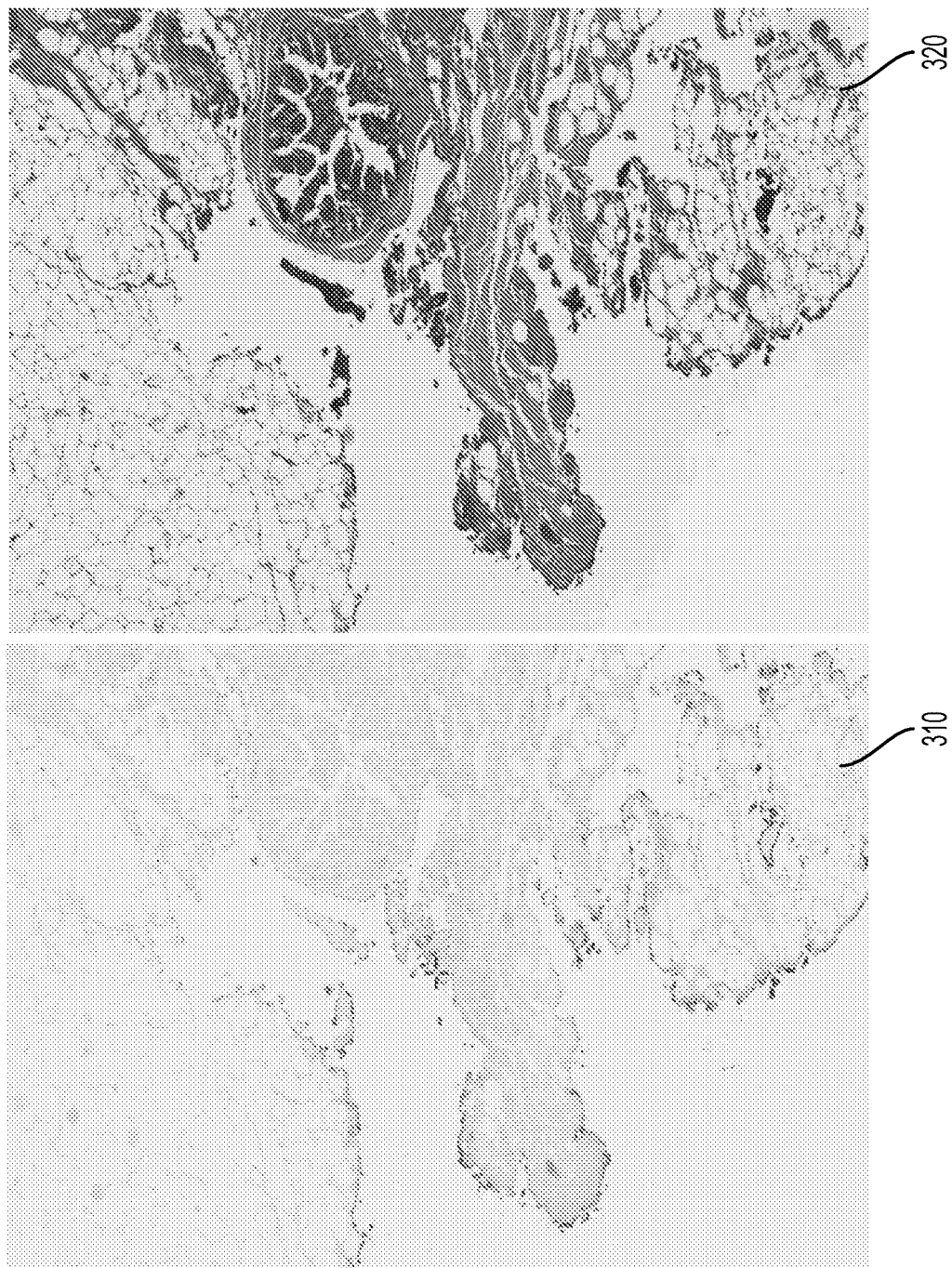
FIG. 3B is an illustration of registered unstained and stained magnified images of the same tissue sample shown side by side.

FIG. 3B is an illustration of registered unstained 310 and H+E stained 320 magnified images of the same prostate tissue sample shown side by side. As illustrated in FIG. 3B, an unstained image includes a great deal of image information that is de-emphasized or diminished when the tissue sample is stained. For example, image information about cell morphology at the edge of the tissue has a greater contrast, relative to mid-tissue image information, in the unstained image 310. However, in the stained image 320, image information about cell morphology of mid-tissue cells has approximately the same image contrast as image information about cells at the edges of the tissue sample.

Figure 4:
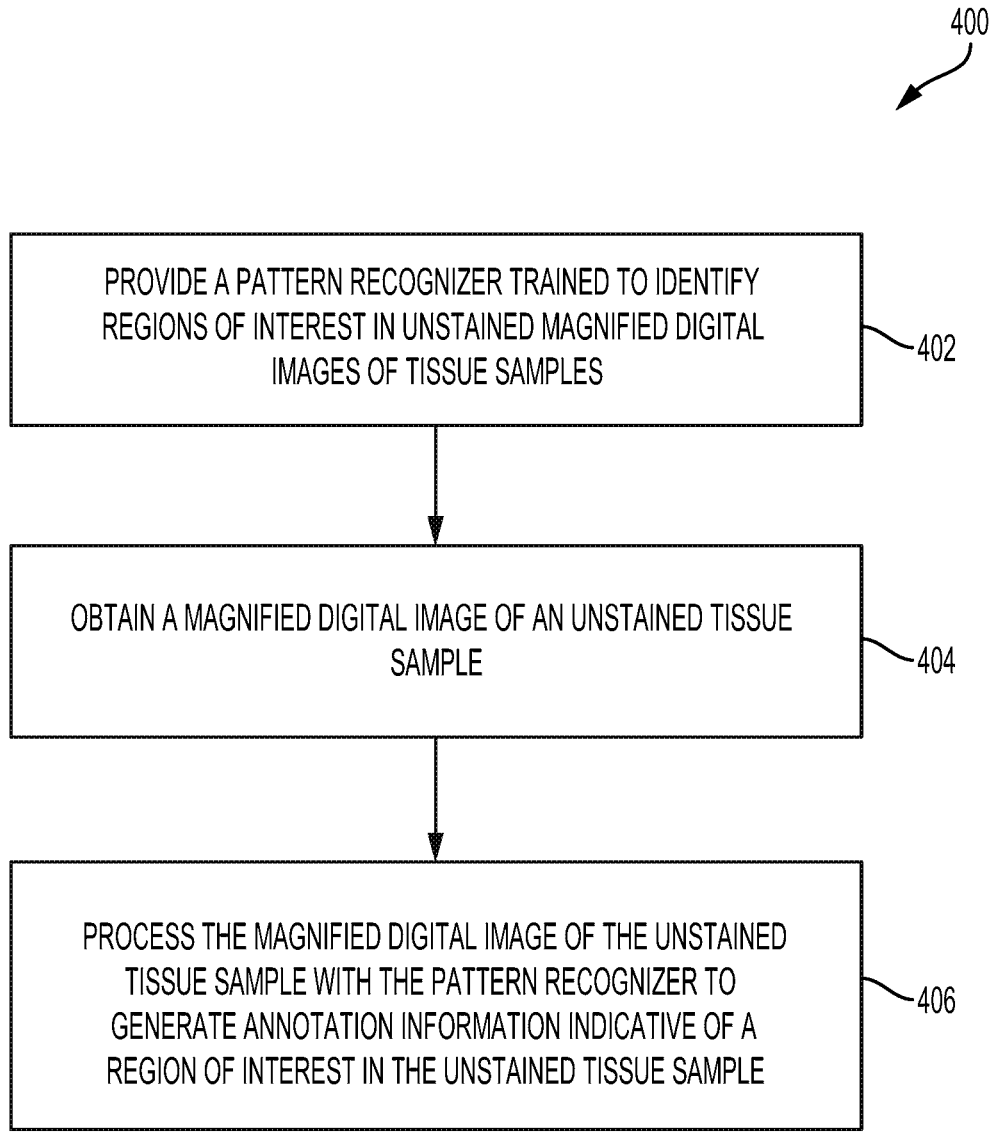
FIG. 4 is a flowchart showing the methodology for using a trained pattern recognizer in accordance with one embodiment.

FIG. 4 is a flowchart showing the methodology for using such a trained pattern recognizer to generate a mask for an unstained tissue specimen image in accordance with one embodiment (e.g., using the system of FIG. 1 as described above). In step 402, a trained pattern recognizer is provided. The pattern recognizer is trained to identify regions of interest (e.g., regions containing cancer cells) in unstained magnified digital images of tissue samples. The pattern recognizer could include an artificial neural network, a convolutional neural network, or some other pattern recognizing algorithms or structures. The trained pattern recognizer could be provided on a non-transitory data storage medium (e.g., a hard drive, a compact disc), via a communications channel (e.g., via the internet), as part of a pathology workstation (e.g., on a hard drive or other data storage of the pathology workstation), or by some other method. Additionally or alternatively, the pattern recognizer could be provided as described above, by using one or more sets of unstained tissue sample images and corresponding masks to train the pattern recognizer.

In step 404 an unstained image of a slide containing a tissue specimen is obtained. This can include scanning the slide in an unstained state at a specified magnification M (e.g., 10×, 20, and/or 40×) in, e.g., the whole slide scanner 106 of FIG. 1.

In step 406, the trained pattern recognizer is applied to process the digital image of the unstained tissue sample (the "unstained image") to generate annotation information (e.g., vertices of a closed polygonal region, locations and curvatures of a splines of a closed region, the identities and/or location of pixels) indicative of a region of interest within the unstained image. Such a region of interest could include cancer cells within the tissue sample. For example, the tissue sample could be a sample of lymph tissue, breast tissue, or prostate tissue and the region of interest could describe the location and/or extent of cancer cells and/or a tumor within such tissues.

In some examples, the trained pattern recognizer could be configured to receive, as input, both the unstained image of the tissue sample and one or more additional, stained images of the tissue sample (obtained, e.g., as described above using a stainer, wash station, etc.). Such a trained pattern recognizer could be trained using sets of corresponding unstained images, stained images, and masks. The masks generated by such a pattern recognizer could be improved relative to a pattern recognizer that is trained to generate masks based only on stained image(s) due to taking advantage of information that is present in the unstained tissue sample images (e.g., features, patterns, regions of contrast) that may be occluded, de-emphasized, abolished, overshadowed, washed out, or otherwise diminished by the presence of a staining agent in the tissue sample.

Figure 5:
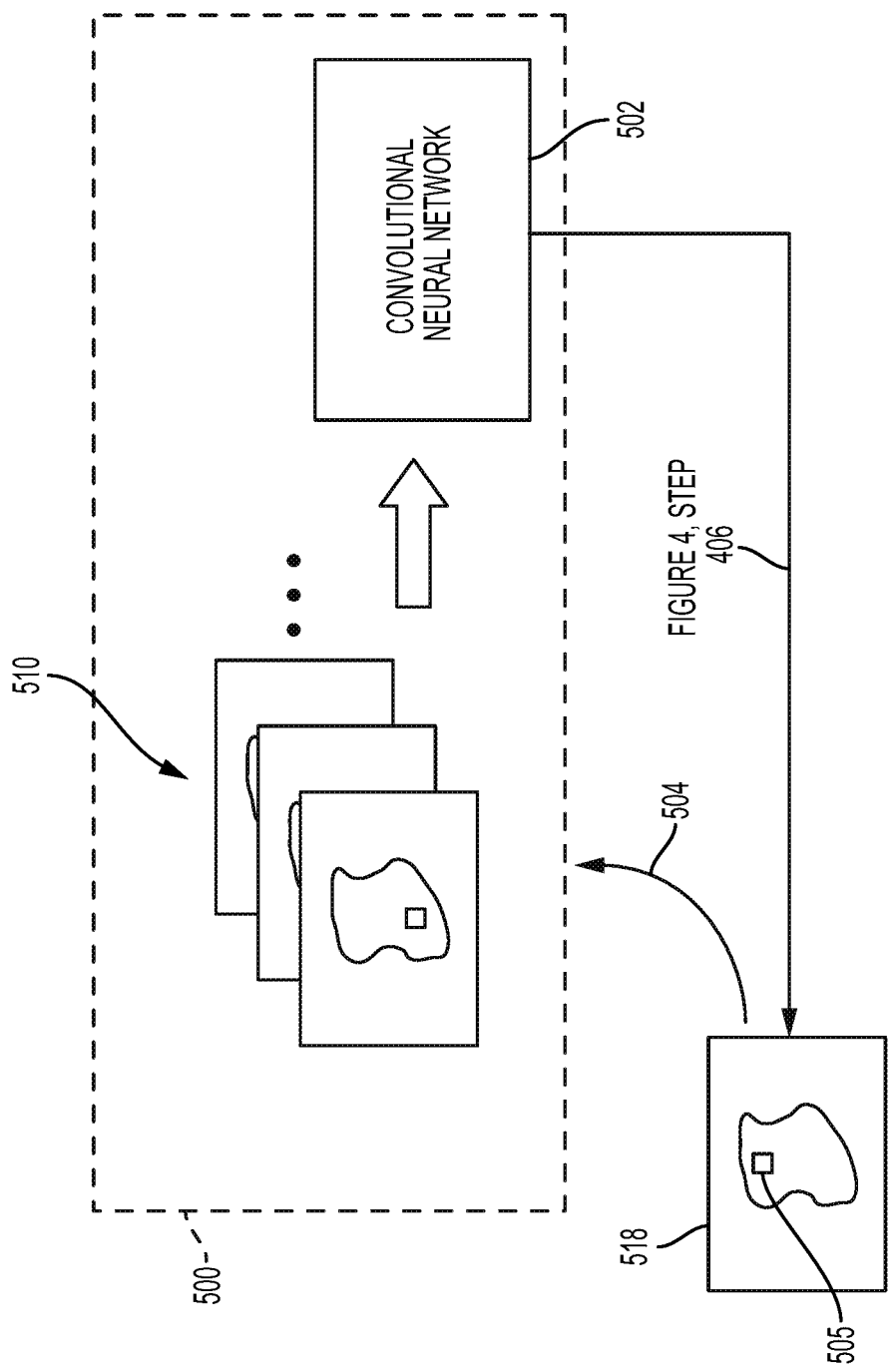
FIG. 5 is a more detailed illustration of the machine learning system of FIG. 1.

A pattern recognizer 500 as described above (e.g., a pattern recognizer of the machine learning system 130 shown in FIG. 1) is shown by way of example in FIG. 5. The pattern recognizer 500 includes a multitude of training instances 510 in the form of magnified digital images of unstained tissue specimens each with a mask or boundary (shown as a small rectangle in FIG. 5) which delineates a region of interest (e.g., a region containing cancer cells). The training instances 510 are used to train a classification engine, such as a convolutional neural network (CNN) pattern recognizer 502, an artificial neural network pattern recognizer, and/or some other type of pattern recognizer, to recognize the presence of some contents of interest (e.g., cancer cells) in tissue samples of the type depicted in the training instances 510 (e.g., prostate, breast, lymph, brain, or other tissue type). Once a suitable number of training instances 510 have been obtained and the performance of the CNN pattern recognizer 502 reaches a point of high accuracy (e.g., by validating the CNN output against a suitable separate test set of images and corresponding masks) then the CNN pattern recognizer 502 can be used to perform step 406 of FIG. 4 on unstained image 518 and generate the mask 505. The training set 510 can be obtained from a library of tissue sections that can be subject to imaging, staining, and annotation steps of this disclosure.

Figure 6B:
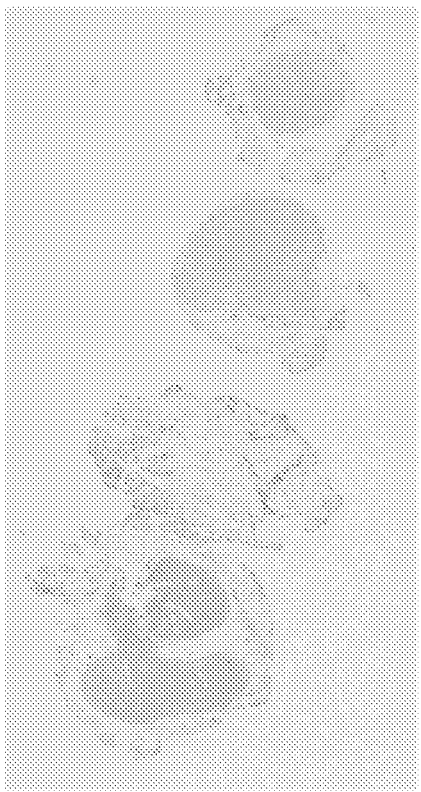
FIG. 6B is a magnified image of the tissue sample of FIG. 6A in an unstained state.
Figure 6D:
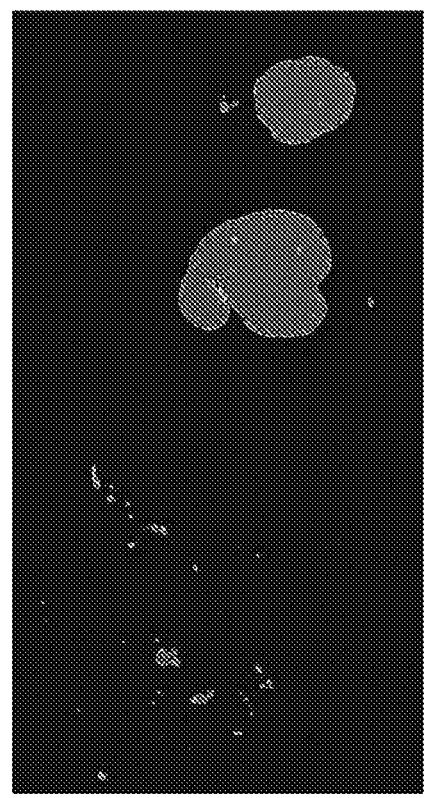
FIG. 6D is an image of a heat map representing the likelihood that a region within the magnified image of the unstained tissue sample of FIG. 6B contains cancer cells.
Figure 6A:
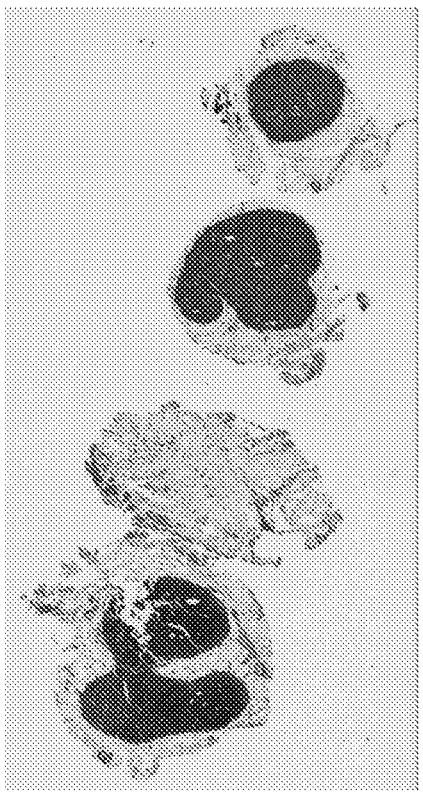
FIG. 6A is a magnified image of a stained tissue sample.
Figure 6C:
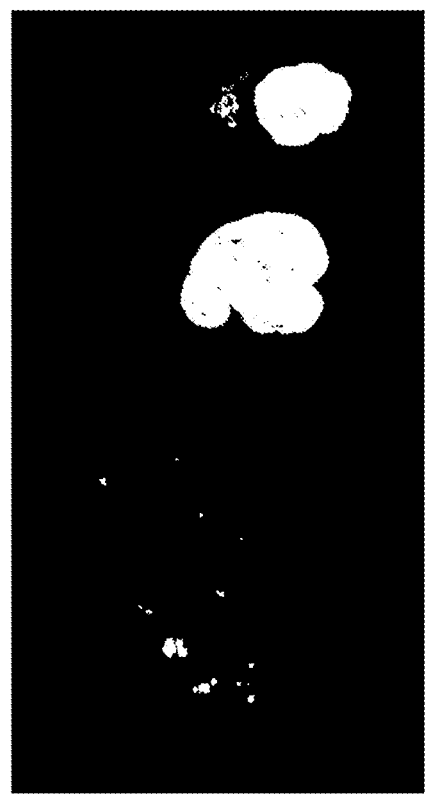
FIG. 6C is an image of a ground-truth mask representing the location of cancer cells in the tissue sample of FIGS. 6A and 6B.
Figures 6E, 6F:
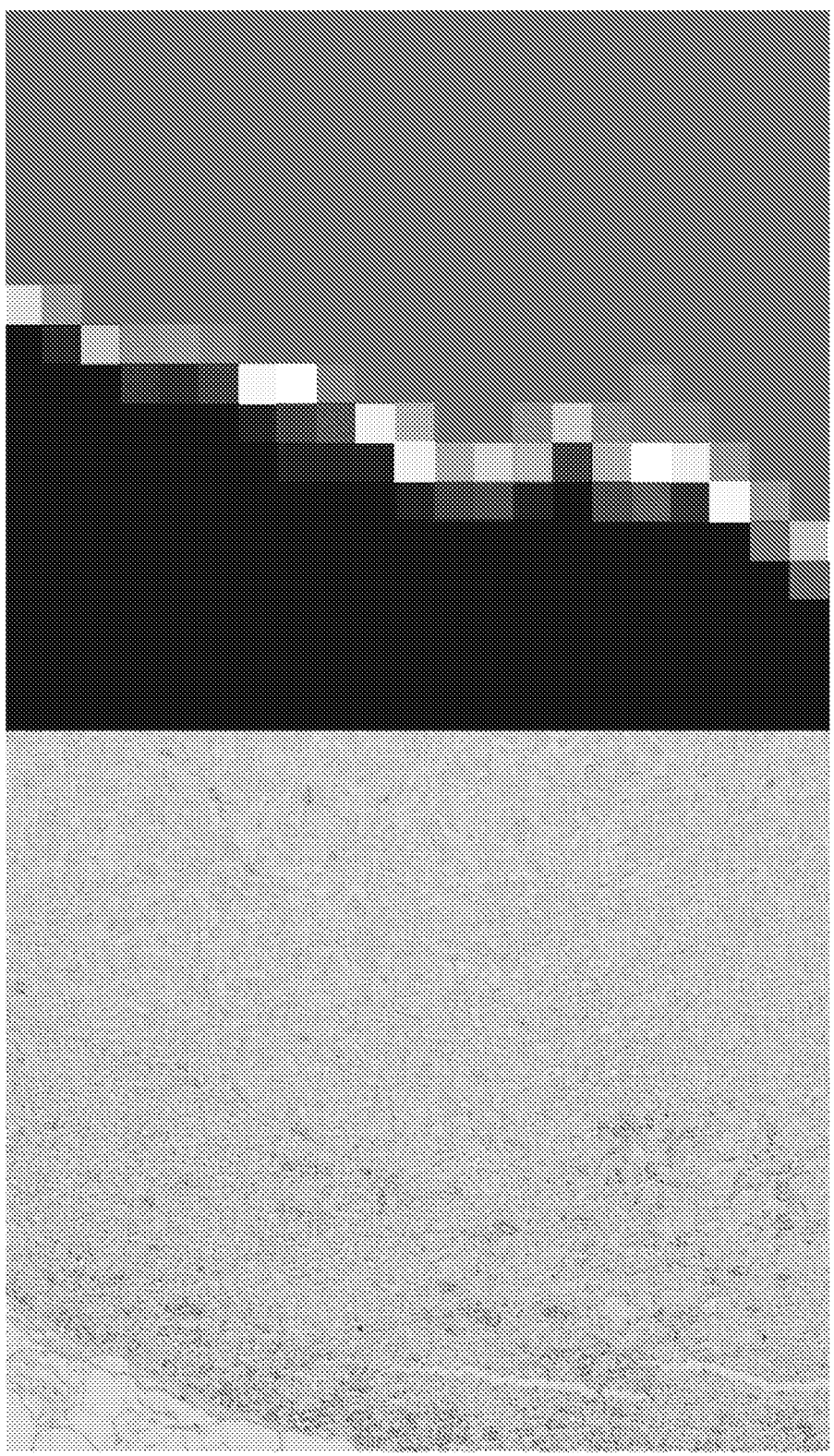
FIG. 6E is a magnified image of an unstained tissue sample.
FIG. 6F is an image of a heat map representing the likelihood that a region within the magnified image of the unstained tissue sample of FIG. 6E contains cancer cells.

FIGS. 6A-F illustrate the application of the methods herein to identifying tumor cells (metastasized from a breast cancer) within lymph node tissue. FIG. 6A is an illustration of a magnified image of a stained lymph node tissue sample, with regions of darker contrast indicating cancerous cells in the tissue sample. FIG. 6B is an illustration of a magnified image of the lymph node tissue sample illustrated in FIG. 6A, prior to being stained (i.e., an unstained tissue sample). FIG. 6C illustrates a ground-truth mask representing portions of the tissue sample of FIGS. 6A and 6B that include cancer cells (white in the figure indicates the location and extent of the tumor). Such ground-truth masks, in combination with corresponding unstained images of lymph node tissue, can be used to train a pattern recognizer (e.g., an artificial neural network) to identify regions of interest within lymph node tissue samples, using the methods described herein. For example, such a pattern recognizer could generate a region-of-interest heat map, as illustrated in FIG. 6D, based on the unstained tissue sample image of FIG. 6B. Lighter regions of the heat map indicate regions of interest. Such a heat map could be used to generate a mask of regions of interest within the unstained tissue sample image (e.g., by thresholding the values of the heat map). FIG. 6E illustrates another unstained magnified image of a tissue sample, and FIG. 6F illustrates a corresponding region-of-interest heat map that could be generated according to the methods described herein and/or used to generate a region-of-interest mask (e.g., by thresholding the values of the heat map of FIG. 6F).

Figure 7A:
FIG. 7A is a magnified image of a stained tissue sample.
Figure 7D:
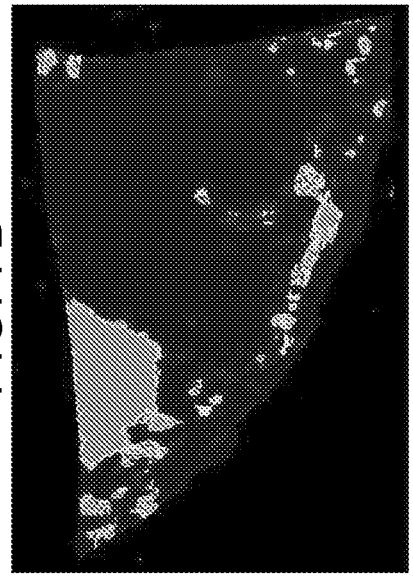
FIG. 7D is an image of a heat map representing the likelihood that a region within the magnified image of the unstained tissue sample of FIG. 7B contains cancer cells.
Figure 7C:
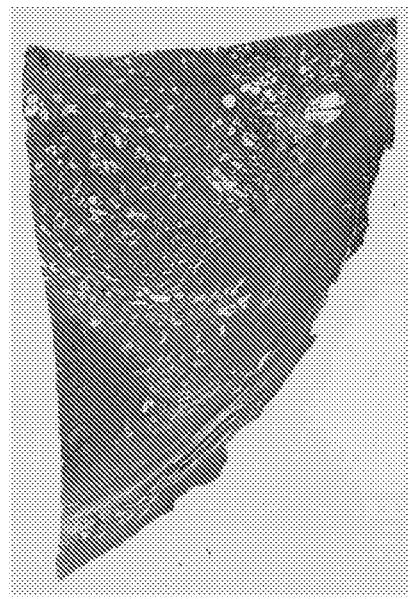
FIG. 7C is an image of a ground-truth mask representing the location of cancer cells in the tissue sample of FIGS. 7A and 7B.
Figure 7D:
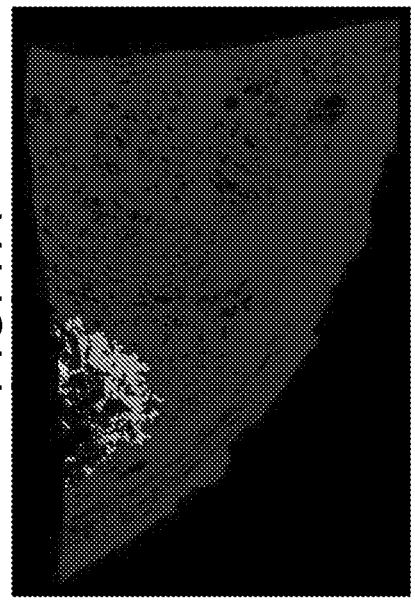

FIGS. 7A-D illustrate the application of the methods herein to identifying prostate adenosarcoma cells within prostate tissue. FIG. 7A is an illustration of a magnified image of a stained prostate tissue sample, with regions of darker contrast indicating cancerous cells in the tissue sample. FIG. 7B is an illustration of a magnified image of the prostate tissue sample illustrated in FIG. 7A, prior to being stained (i.e., an unstained tissue sample). FIG. 7C illustrates a ground-truth mask representing portions of the tissue sample of FIGS. 7A and 7B that include cancer cells (white in the figure indicates the location and extent of the tumor). Such ground-truth masks, in combination with corresponding unstained images of prostate tissue, can be used to train a pattern recognizer (e.g., an artificial neural network) to identify regions of interest within prostate tissue samples, using the methods described herein. For example, such a pattern recognizer could generate a region-of-interest heat map, as illustrated in FIG. 7D, based on the unstained tissue sample image of FIG. 7B. Lighter regions of the heat map indicate regions of interest. Such a heat map could be used to generate a mask of regions of interest within the unstained tissue sample image (e.g., by thresholding the values of the heat map.

What is claimed is:

1. A method of training a pattern recognizer to identify regions of interest in a tissue sample, comprising the steps of:
    obtaining magnified digital images of the tissue sample, one of which represents the tissue sample after having been stained with a staining agent ("stained image") and one of which represents the tissue sample in an unstained state ("unstained image"),
    annotating the stained image so as to form a mask surrounding a region of interest ("ROI") in the stained image;
    transferring the mask from the stained image to the unstained image; and
    training the pattern recognizer to identify ROIs in unstained images of tissue samples using the unstained image having the transferred mask as a training example.

2. The method of claim 1, further comprising aligning the stained and unstained images.

3. The method of claim 1, wherein the pattern recognizer comprises an artificial neural network.

4. The method of claim 3, wherein the artificial neural network is a convolutional neural network.

5. The method of claim 1, wherein the mask surrounds at least one closed polygonal region in the stained image.

6. The method of claim 1, wherein the tissue sample is a sample of lymph tissue.

7. The method of claim 1, wherein the tissue sample is a sample of breast tissue.

8. The method of claim 1, wherein the tissue sample is a sample of prostate tissue.

9. The method of claim 1, wherein the staining agent comprises an immunohistochemical (IHC) stain.

10. The method of claim 1, wherein the staining agent comprises a haematoxylin and eosin stain.

11. A method of identifying a region of interest in an unstained tissue sample, comprising:
providing a pattern recognizer trained to identify regions of interest in unstained magnified digital images of tissue samples;
obtaining a magnified digital image of an unstained tissue sample; and
processing the magnified digital image of the unstained tissue sample with the pattern recognizer to generate annotation information indicative of a region of interest in the unstained tissue sample.

12. The method of claim 11, wherein the pattern recognizer comprises an artificial neural network.

13. The method of claim 12, wherein the artificial neural network is a convolutional neural network.

14. The method of claim 11, wherein the annotation information is indicative of at least one closed polygonal region in the unstained image.

15. The method of claim 11, wherein the tissue sample is a sample of lymph tissue.

16. The method of claim 11, wherein the tissue sample is a sample of breast tissue.

17. The method of claim 11, wherein the tissue sample is a sample of prostate tissue.

18. The method of claim 11, further comprising:
obtaining a magnified digital image of the tissue sample after having been stained with a staining agent ("stained image");
wherein the pattern recognizer trained to identify regions of interest in unstained magnified digital images of tissue samples is trained to identify regions of interest in unstained magnified digital images of tissue samples based on unstained magnified digital images of tissue samples and magnified digital images of such tissue samples after having been stained with a staining agent, and wherein processing the magnified digital image of the unstained tissue sample with the pattern recognizer to generate annotation information comprises processing the magnified digital image of the unstained tissue sample and the magnified digital image of the tissue sample after having been stained with the staining agent with the pattern recognizer to generate the annotation information.

19. The method of claim 18, further comprising aligning the unstained image and the magnified digital image of the unstained tissue sample.

20. A system comprising:
a memory storing non-transient processor readable instructions; and
one or more processors arranged to read and execute instructions stored in said memory;
wherein said processor readable instructions comprise instructions arranged to control the system to carry out a method according to claim 11.

* * * * *